(12) United States Patent
Van Der Noll

(10) Patent No.: US 8,221,286 B2
(45) Date of Patent: Jul. 17, 2012

(54) METHOD FOR CONTROLLING A FRICTION-TYPE CONTINUOUSLY VARIABLE TRANSMISSION AND A TRANSMISSION EQUIPPED WITH MEANS FOR CARRYING OUT THE METHOD

(75) Inventor: Erik Van Der Noll, Dordrecht (NL)

(73) Assignee: Robert Bosch GmbH, Stuttgart (DE)

( * ) Notice: Subject to any disclaimer, the term of this patent is extended or adjusted under 35 U.S.C. 154(b) by 279 days.

(21) Appl. No.: 12/668,441

(22) PCT Filed: Jul. 11, 2008

(86) PCT No.: PCT/EP2008/059092
§ 371 (c)(1),
(2), (4) Date: Mar. 5, 2010

(87) PCT Pub. No.: WO2009/007450
PCT Pub. Date: Jan. 15, 2009

(65) Prior Publication Data
US 2010/0198467 A1   Aug. 5, 2010

(30) Foreign Application Priority Data
Jul. 11, 2007  (WO) ................ PCT/EP2007/057105

(51) Int. Cl.
*B60W 10/02*  (2006.01)
*F16H 61/00*  (2006.01)
(52) U.S. Cl. ............... 477/44; 474/67; 474/62
(58) Field of Classification Search .............. 477/44, 477/78, 46, 68; 474/75, 70, 69, 67, 62, 61
See application file for complete search history.

(56) References Cited

U.S. PATENT DOCUMENTS

| | | | | |
|---|---|---|---|---|
| 3,698,497 A | * | 10/1972 | Bombardier | 180/190 |
| 4,274,295 A | * | 6/1981 | Grube | 474/23 |
| 4,673,378 A | | 6/1987 | Tokoro et al. | |
| 5,259,272 A | * | 11/1993 | Yamamoto et al. | 477/45 |
| 5,720,692 A | * | 2/1998 | Kashiwabara | 477/45 |
| 5,871,411 A | * | 2/1999 | Senger et al. | 474/11 |
| 8,118,707 B2 | * | 2/2012 | Brandsma et al. | 477/176 |

FOREIGN PATENT DOCUMENTS

| | | |
|---|---|---|
| DE | 10 2004 028 012 | 1/2006 |
| EP | 1 236 935 | 9/2002 |
| EP | 1 482 216 | 12/2004 |
| EP | 1 526 309 | 4/2005 |
| EP | 1 579 127 | 9/2006 |

OTHER PUBLICATIONS

International Search Report dated Feb. 3, 2009, from corresponding PCT application.

* cited by examiner

*Primary Examiner* — Ronnie Mancho
(74) *Attorney, Agent, or Firm* — Young & Thompson

(57) ABSTRACT

A method for controlling a normal force exerted in a frictional contact of a friction type continuously variable transmission with a rotatable input shaft and a rotatable output shaft, includes the steps of:
 generating a first parameter signal that is representative of changes in one of, or a ratio or difference between both of, a rotational speed of the input shaft and a rotational speed of the output shaft,
 generating a second parameter signal that is representative of changes in the normal force in the frictional contact of the transmission,
 generating a third parameter signal that is representative of and is preferably proportional to the multiplication of the first and second parameter signals,
 and:
 controlling the normal force in the frictional contact in dependence on a characteristic of the third parameter signal.

20 Claims, 3 Drawing Sheets

METHOD FOR CONTROLLING A FRICTION-TYPE CONTINUOUSLY VARIABLE TRANSMISSION AND A TRANSMISSION EQUIPPED WITH MEANS FOR CARRYING OUT THE METHOD

FIELD OF THE INVENTION

The present invention relates to a method for controlling a friction type continuously variable transmission or CVT that is typically used in the drive line of a motorised vehicle. In particular, the invention relates to a method for controlling a normal force exerted in a frictional contact of the transmission. More specifically, the invention was conceived in relation to the well known belt CVT, comprising two pulleys that are respectively provided on a rotatable input shaft and a rotatable output shaft and that are in frictional contact with a flexible drive belt of the transmission, which belt is arranged around and between the pulleys thus providing a driving connection there between.

BACKGROUND OF THE INVENTION

Such a transmission is generally known and is for example described in EP-A-1 579 127. In this known transmission the said normal force is actively controlled by a control system of the transmission based on a difference between an actual transmission slip value and a desired slip value, i.e. by adjusting the normal force such that the said difference is minimised. In this respect, it is recalled that the term slip is used to refer to the difference in (tangential) speed of the transmission components in the said frictional contact.

Several methods are available to determine and/or measure the actual transmission slip. In practice, in calculating the actual slip in the belt CVT, in addition to the (longitudinal) belt speed also a running radius thereof at each pulley, i.e. between pulley discs thereof, is to be taken into account in order to determine the local tangential speed of the pulley. Moreover, the belt CVT actually comprises a series arrangement of two frictional contacts, i.e. one between the drive belt and each pulley, which should both be taken into account. In this case it is convenient to define and determine the transmission slip in relation to the deviation between the transmission's speed ratio, i.e. the difference between or quotient of the rotational speed of the respective pulleys/shafts, and its geometric ratio, i.e. the difference between or quotient of the running radius of the drive belt on the respective pulleys.

Besides the instantaneously prevailing or actual transmission slip, the known control method also requires a desired value for the transmission slip for the control of the normal forces. Indeed several publications are available that address this issue, e.g. by providing a method for selecting a desired slip value in dependence on the transmission ratio and/or the torque to be transmitted. In this respect it is as an example referred to EP-A-1 526 309 that a/o suggests to adopt as the desired slip value the pre-determined amount of transmission slip that provides the optimum torque transmission efficiency.

Although the known control method may function well per se, it can be difficult to implement in practice at least in mass production. First of all, it is difficult to measure the transmission geometric ratio, as determined by the running radii of the drive belt on the pulleys, sufficiently accurate. Moreover, the known means and/or computation methods for determining the actual transmission slip will add to the manufacturing cost of the CVT unit and thus to its economically viable sales price, whereas the increase in vehicle fuel efficiency and cost savings made possible thereby occur and accumulate only during the—prolonged—use of the vehicle. Any such initial investment typically inhibits consumer acceptance and thus hampers the introduction of this new technology. Further, the known control method requires a relatively complicated algorithm that is able to generate an actual transmission slip value, to generate a desired slip value in dependence on the operation conditions of the CVT, to compare both said slip values and to generate appropriate control signals based thereon, all in real time and under unpredictably varying circumstances, e.g. disturbances. It has been found difficult to design such an algorithm that is sufficiently flexible and still provides the required computational speed and robustness.

SUMMARY OF THE INVENTION

It has, therefore, been an aim of the present invention to simplify the existing transmission slip control methods, preferably by reducing the number and complexity of the computations required to execute the control method such that the required algorithm may be more easily designed and implemented. It is a further aim of the invention to use only sensors that are already incorporated in contemporary transmission designs for generating a respective parameter signal representative of the instantaneous magnitude of a transmission parameter, such as a shaft or pulley (rotational) speed sensor and a hydraulic (pulley) pressure sensor.

The method according to the invention includes at least the steps of:
  generating a first parameter signal that is representative of changes in one of, or a ratio or difference between both of, the rotational speed of the input shaft and the rotational speed of the output shaft,
  generating a second parameter signal that is representative of changes in the normal force in the frictional contact of the transmission,
  generating a third parameter signal that is proportional to the multiplication of the said first and second parameter signals, and of:
  controlling the normal force in the frictional contact in dependence on a characteristic of the third parameter signal.

The invention also relates to a continuously variable transmission equipped with means for carrying out the above method according to the invention.

A suitable characteristic of the third parameter signal for the control of the normal force is its sign (positive or negative). More in particular, the normal force is lowered if such sign is positive. If the third parameter signal is zero, or at least virtually equal to zero, the normal force level is maintained, i.e. is kept constant and, if the third parameter signal comprises a substantial negative component, the normal force is increased, as the latter behaviour of the signal indicates that the transmission slip moves towards the excessive slip regime. Preferably, such normal force adjustments are additionally controlled in relation to the instantaneous magnitude of the third parameter signal or, more preferably, i.e. to avoid or at least dampen unwanted control action oscillations, the progressive average or effective value thereof. Hereby, a force increase may be effected more rapidly in relation to such effective value than a force decrease, because a force undershoot is to be avoided more rigorously since the drive belt can easily be damaged by an excessive slipping thereof, whereas a force overshoot will not have any permanent detrimental effect.

According to the invention with the above unexpectedly simple, if not ultimately basic, control method the transmission may indeed be properly controlled. It was found by this method that the normal force is maintained at a very low level automatically, thus providing an exceptionally good transmission efficiency while effectively and reliably keeping the transmission slip at an acceptable level. It is noted that in such self-optimising control method according to the invention the conventionally applied steps of generating a parameter signal that represents the actual slip and of comparing this signal with the desired slip to determine the control deviation, as the input for the normal force adjustment, are advantageously omitted.

It is presently believed that the above control method, which has been tried and tested in practice and was found to function effectively and consistently, relies on the naturally occurring phenomenon that the mutual dependency of and/or coherence between the above mentioned transmission parameters of rotational speed or speeds on the one hand and of normal force on the other one hand changes as the actual slip increases. That is to say that, when the normal force is very high in relation to the torque to be transmitted and virtually no slipping occurs in the said frictional contact, a change in a first one of the said transmission parameters is reflected by a proportional and effectively instantaneous change in the other one transmission parameter. However, as the normal force decreases in relation to the torque to be transmitted such coherence reduces up to the point where the mutual relation between such transmission parameters is completely lost. Decreasing the normal force even further results in an excessive slipping occurring in the frictional contact as a result of the torque to be transmitted exceeding a maximum transmissible torque level. In between the above described two extremes the behaviour of the said mutual relation between the transmission parameters, denoted the transmission transfer behaviour, is such that with the method according to the invention the normal force and the actual transmission slip automatically converge to functionally acceptable levels that, moreover, favourably provide a very good, if not optimum transmission efficiency.

The requirement in accordance with the invention that the said first and second parameter signals are representative of at least changes in a respective transmission parameter, is of course already satisfied by a basic parameter signal that represents the instantaneous (absolute) magnitude of such respective transmission parameter. Hereto, a respective basic parameter signal may for example be provided with a magnitude, e.g. in terms of the voltage thereof, that is proportional to the said magnitude of such respective transmission parameter. Preferably, however, such a basic parameter signal is also filtered to generate the first and/or second parameter signal in accordance with the invention, which latter signal(s) than represent(s) only the changes in a respective transmission parameter that occur at a certain filter frequency or range of filter frequencies. After all, the control method according to the invention relies in particular only on (the coherence between) such changes in the said transmission parameters, rather than on the absolute value thereof.

Thus, according to the invention, it is to be preferred that in advance of the said multiplication of the first and second parameter signals, a first target frequency or range of target frequencies is selected from one or of both said first and second parameter signals, e.g. is filtered out of the original, composite parameter signal by means of a band-pass filter. Only such filtered parameter signal component then being used in the said multiplication to generate the said third parameter signal. In this manner, disturbances such as (measured) signal noise and unrelated signal (frequency) components will be favourably removed there from, thus yielding a more accurate and favourably stable control, at least in terms of the said third parameter signal. In this respect it is very advantageous that the said target frequency or the said range of target frequencies of the band-pass filter, which is applied in accordance with the invention, lies above a maximum rate of change of the geometric transmission ratio, such that a change in the said transmission parameters as a result of a change in transmission ratio will not be interpreted as pure transmission slip by the control method. Therefore, according to the invention, the target frequency or range of target frequencies should at least be higher than 1 Hz. On the other hand, the target frequency or range of target frequencies should include the slip frequency, i.e. should be able to catch the changes in the transmission slip actually occurring in practice. Therefore, according to the invention, the target frequency or range of target frequencies should not be higher than 15 Hz. It is considered particularly advantageous to set the target frequency or range of target frequencies between 2 to 8 Hz, since at these lower values a residual influence of the change in transmission ratio on the slip control is allowed, whereby, especially during rapid ratio changes, the normal force that is applied in relation to the torque to be transmitted will be somewhat larger than during steady state transmission operation. Moreover, since the actually occurring slip is reduced during such ratio changes, the safety margin against macro slip is temporarily and favourably increased without detrimentally affecting the overall transmission efficiency, at least not substantially. A narrow band pass filter that filters out the 4 Hz component of the input signals, i.e. the said first and second parameter signals is considered a very suitable means in this respect.

According to the invention, in particular the (changes in the) speed ratio between the transmission parameters of the rotational speed of the input shaft and of the output shaft of the transmission are suited for use in the method, i.e. for generating the said first parameter signal, since these transmission parameters are normally already measured with sufficient accuracy by electronic means in many of the contemporary transmission designs. Indeed, for generating the said second parameter signal, the instantaneous normal force need not necessarily be measured, but it could also be estimated based on a characteristic of the means employed in realising such force. For example, if the normal force is generated hydraulically—as is typically the case in the field of CVT—, such characteristic could be an activation pressure or force of a normal force control valve, or even the mere electronic activation signal of such valve, at least provided that a sufficiently accurate model of the hydraulic system is used.

Additionally, at least one of said transmission parameters of rotational speed or speed ratio and of normal force is actively oscillated at a certain—preferably fixed or possibly variable—frequency as part of the present control method. In this case the (target frequency or range of target frequencies of the) band pass filter is of course set to match such oscillation frequency. The band pass filter may also not be used at all, as the desired parameter signal component may be directly represented by or selected from the signal that controls or otherwise regulates such active oscillation.

Moreover, in case of such active oscillation, the frequency thereof is typically limited to a range between 1 Hz and 15 Hz due to the technical limitations of the existing transmission systems. Preferably, the frequency of the active oscillation is about 4 Hz, e.g. between 3 to 5 Hz. The main advantage of this latter setup of the control method is that a very well defined and thus easily detectable and selectable—whether by filtering or otherwise—response is obtained.

According to the invention, preferably the normal force is forced to oscillate and, more preferably, the amplitude of the oscillation is chosen relatively small, e.g. varying by 2.5% to 25%, preferably about 5% to 10% of the effective value thereof. Hereby, both the energy required for and/or dissipated by such oscillation and the resulting speed ratio oscillations are limited as much as possible. In this respect, it has been found that the response of the speed ratio to a given excitation by the normal force oscillation varies with the operation conditions of the CVT, in particular with the geometric ratio thereof. More in particular, said response to such excitation of given magnitude (energy) may be satisfactory in an accelerating transmission ratio ("Overdrive") of the CVT, but may prove inadequate in a decelerating transmission ratio ("Low"). For addressing all of the above constraints, the invention, in a detailed embodiment thereof, relates to a method wherein the normal force is oscillated at a certain frequency and amplitude, whereof at least the amplitude varies in relation to one or more operation conditions of the CVT, in particular in relation to the speed ratio thereof.

Further, to reduce the level of the transmission slip during operation of the transmission and thereby to reduce belt wear and/or risk of belt macro slip occurring, it may be opted to slightly offset the third parameter signal relative to zero, i.e. to add a predetermined signal component thereto. Preferably, such signal component has a negative sign such that the instantaneous magnitude of the signal and its effective value are reduced and the drive belt slipping is favourably reduced as a consequence.

The control method according to the invention is particularly advantageous in that, in the self-optimising normal force control realised thereby, the resulting trans-mission efficiency is comparatively, if not ultimately high. In particular, it was found that by using the two different types of transmission parameters, namely of rotational (shaft) speed and of (normal) force, a noticeably higher transmission efficiency may be obtained than with a similar control method that would, however, rely on a single type of transmission parameter for both said first and second parameter signals. Incidentally, it is remarked that an example of such latter control method relying on a single type of transmission parameter, namely of (normal) force, is taught by the European patent EP-B-1 236 935.

BRIEF DESCRIPTION OF THE DRAWINGS

The invention will now be elucidated further in a preferred embodiment thereof and along the accompanying drawing figures, whereof.

DETAILED DESCRIPTION OF THE DRAWINGS

Figure 1:
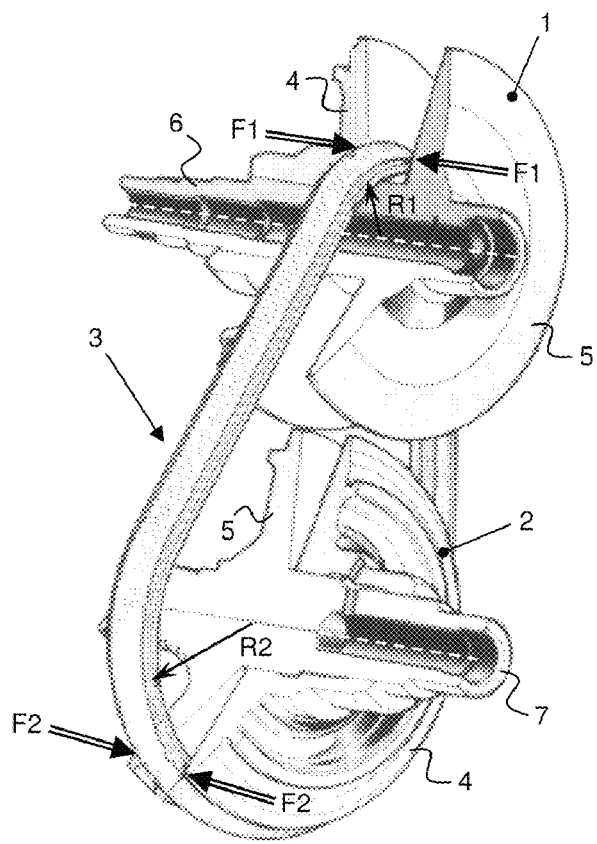
FIG. 1 provides the basic layout of the known continuously variable transmission with two pulleys and a drive belt, FIG. 2 provides a cross-section in longitudinal direction of a known type of drive belt that is often used in such transmission.

FIG. 1 is a schematic depiction drawn in perspective of the known continuously variable transmission that is provided with two pulleys 1, 2 and a drive belt 3 that is wrapped around and in frictional contact with the pulleys 1, 2. The pulleys 1, 2 are each provided with two conical discs 4, 5 on a respective pulley shaft 6 or 7, between which discs 3, 4 a tapered groove of variable width is defined that accommodates a longitudinally bent part of the drive belt 3, an effective radius of contact R1, R2 existing there between. At least one disc 4 of each pulley 1 and 2 is axially movable towards the respective other disc 5, e.g. by means of a piston/cylinder-assembly (not shown) that associated with each respective pulley, for exerting a respective axially oriented clamping force F1, F2 on the belt 3. Because of the conical shape of the pulley discs 4, 5 these clamping forces F1, F2 are split in a first force component perpendicular or normal to the frictional contact between belt 3 and pulleys 1, 2 and a radially oriented second component by which the belt 3 is tensioned. The level of a respective normal force component Fn1, Fn2 determines the drive force that can be transferred between the belt 3 and the respective pulley 1 or 2 by means of friction, whereas the ratio Fn1/Fn2 there between determines and is used to control the said effective contact radii R1 and R2 between the belt 3 and the respective pulleys 1 and 2. The so-called geometric transmission ratio being quantified as the quotient of these radii R1 and R2. In FIG. 1 the transmission is depicted in the largest possible geometric ratio R2/R1, which corresponds to the smallest transmission speed ratio $\omega 2/\omega 1$ that is defined as the quotient of a transmission output speed $\omega 2$ (i.e. the rotational speed of an output shaft 7 and of the associated, i.e. output pulley 2) and of a transmission input speed $\omega 1$ (i.e. the rotational speed $\omega 1$ of an input shaft 6 and of the associated, i.e. input pulley 1). The said clamping forces F1, F2 and thus also the normal force components Fn1, Fn2 thereof are realised by exerting a respective hydraulic cylinder pressure P1, P2 in the piston/cylinder-assembly associated with the axially moveable discs 4 of a respective pulley 1, 2. This type of transmission and its operation and control are all well known in the art.

Figure 2:
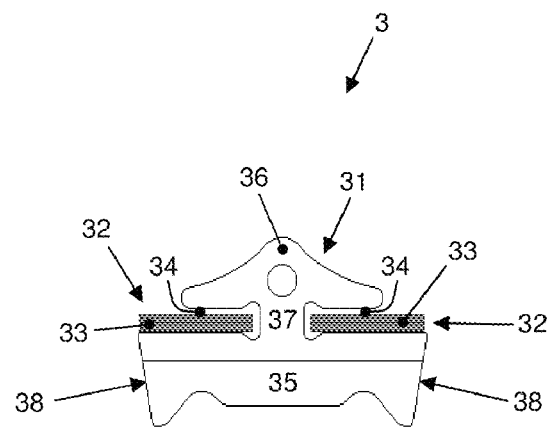

In FIG. 2 an example of the drive belt 3 shown in a longitudinal cross-section thereof. The drive belt 3 of FIG. 2 is of the known, so-called pushbelt or Van Doorne type. The pushbelt 3 comprises an endless tensile body 32, which is composed of two sets of a number of 'nested', i.e. mutually radially stacked, continuous flat metal rings 33, and a relatively large number of metal segments 31, the so-called transverse elements 31. The sets of rings 33 are each mounted in a respective recess or slot 34 of the transverse elements 31, allowing the elements 31 to slide along the circumference of the tensile body 32 while being oriented predominantly transversely thereto. Each such slot 34 is provided on and opens towards a lateral side of the transverse element 31 in-between an effectively trapezoid-shaped lower part 35 and a more or less arrow-head shaped upper part 36 of the element 20. These upper and lower parts 35 and 36 are interconnected via a central pillar part 37 of the transverse element 31. The transverse elements 31 of the belt 3 arrive into contact with the pulleys 1 and 2 during operation of the transmission through lateral contact or friction surfaces 38 that are normally provided with a surface profile.

It is, amongst others, known to control the level of the above-mentioned clamping forces F1, F2 to the force levels that are respectively required to transmit a driving torque to be transmitted by the transmission. One possible control method comprises the steps of determining an actual value of a slip of the drive belt 3 relative to the pulleys 1, 2, i.e. a relative movement or (angular) speed difference there between, of determining a desired value for such transmission slip in relation to various transmission parameters and of adjusting the said clamping forces F1, F2 to make the actual slip coincide with the desired slip. The current invention, however, provides for a new control method that favourably circumvents at least the above step of determining a desired slip value. Also, the actual slip value is as such not determined in the method according to the invention.

The method according to invention will be illustrated in the below in the preferred embodiment thereof that involves the transmission parameters of the said speed ratio $\omega2/\omega1$ and the normal force $Fn2$ of the output pulley 2, the latter as represented by (i.e. directly proportional to) the hydraulic cylinder pressure P2 exerted in the piston/cylinder-assembly of the output pulley 1, 2, hereinafter referred to as the output pulley pressure P2.

Figure 3:
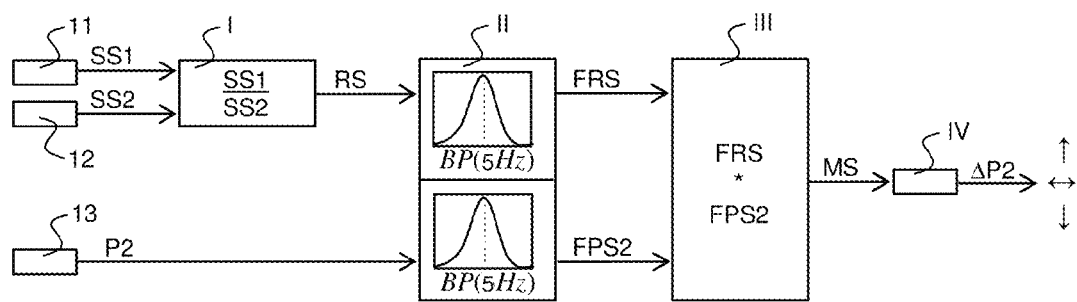
FIG. 3 illustrates in a functional block diagram a preferred embodiment of the slip control method according to the invention.

In FIG. 3 the overall control scheme of this preferred embodiment of the control method according to the present invention is illustrated by means of a block diagram. It is shown in FIG. 3 that the control scheme requires three sensors 11, 12 and 13. The first sensor 11 detects the transmission input speed $\omega1$ and generates a respective first speed parameter signal SS1 (e.g. an electronic current, voltage, frequency and/or amplitude) that is proportional thereto. The second sensor 12 detects the transmission output speed $\omega2$ and generates a respective second speed parameter signal SS2 that is proportional thereto. The third sensor 13 detects the said output pulley pressure P2 and generates a respective output pressure parameter signal PS2 that is proportional thereto. In this respect it is remarked that this particular setup of the control method is considered favourable in that such speed and pressure sensors 11-13 are standard equipment in many contemporary transmission designs, which are capable to generate a respective parameter signal at a sufficient sample frequency, e.g. at least twice the target frequency of the band pass filter mentioned below in relation to block II.

Next, in block I of the control scheme, a transmission speed ratio signal RS is generated that is proportional to the ratio SS1/SS2 between the first speed signal SS1 and the second speed signal SS2 respectively.

Next, in block II, a signal component of a desired frequency or range of frequencies is generated for both the transmission speed ratio signal RS and the output pressure signal PS2. More specifically, both said signals RS and PS2 are separately passed through a so-called band pass filter that filters out such signal component, in this particular example the 5 Hz frequency component. These filtered signals are hereinafter referred to as the filtered speed ratio signal FRS and the filtered output pressure signal FPS2 respectively.

Next, in block III, a multiplication signal MS is generated that is proportional to the multiplication FRS*FPS2 of the filtered speed ratio signal FRS and the filtered output pressure signal FPS2. It is this multiplication signal MS or at least a characteristic thereof that is subsequently used to control the transmission, in particular to control the said output pulley pressure P2, in which case the input pulley pressure P1 is obtained as a consequence of maintaining a desired transmission speed ratio in a well-known manner. To this end an appropriate control action $\Delta P2$ is generated in block IV, which action $\Delta P2$ consists of either increasing "↑", maintaining "⇆" or decreasing "↓" a current output pulley pressure level P2.

Figure 4:
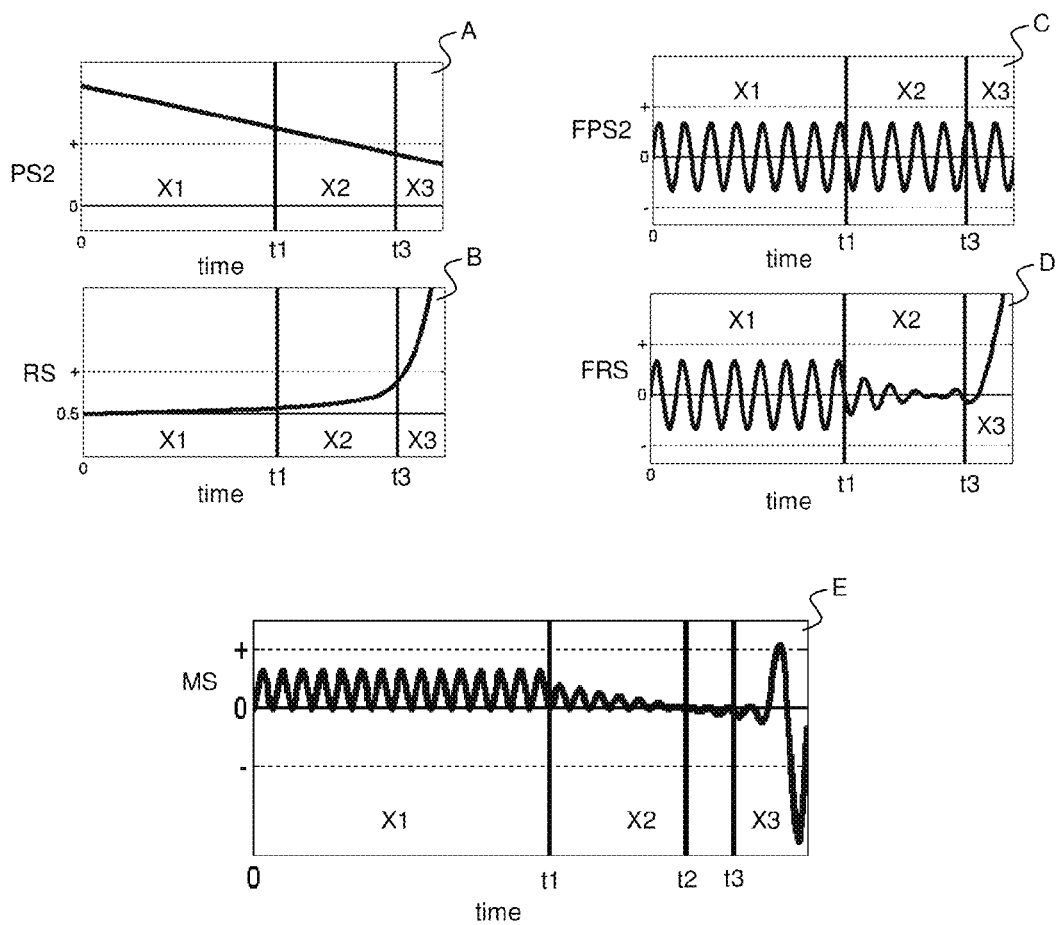
FIG. 4 illustrates the above slip control method according to the invention in a number of graphs and FIGS. 5-7 graphically illustrate further elaborations of the invention.

In FIG. 4 the principle of the above described control scheme according to the invention is illustrated by means of graphs of the respective signals RS, FRS, PS2, FPS2 and MS involved. Graph A shows by way of example a linear decrease of the output pulley pressure P2 in relation to the passing of time. Graph B shows, also by way of example, the measured transmission speed ratio RS that may result from such forced output pulley pressure P2 decrease at a constant level of the transmitted torque.

Graph B shows three principle modes or regimes of operation. In the left-most section of graph B, i.e. until time t1 is reached, there is hardly any slip occurring between the belt 3 and the pulleys 1, 2, i.e. the normal forces Fn1, Fn2 determined by the output pulley pressure P2 are more than sufficient to allow the transmission torque to be transmitted by friction. As a result the transmission speed ratio RS will at least virtually be equal to the geometric ratio R2/R1, i.e. 0.5 in this example. This is the so-called micro slip regime X1, wherein the efficiency of the transmission is not optimal as the clamping forces F1, F2 are considerably higher than is strictly required for transmitting the transmission torque. On the other hand, in the right-most section of graph B, i.e. after time t3, the transmission is in a so-called macro slip regime X3, wherein the transmission is just about capable of transmitting the torque and wherein a considerable relative movement, i.e. slipping occurs between the belt 3 and at least one pulley 1, 2. As a result the transmission speed ratio RS will deviate considerably from the geometric ratio R2/R1. At some point in the macro slip regime X3 the transmission may not be able to transmit the torque at all, at which output pulley pressure P2 the transmission slip will increase uncontrollably, such that excessive slip occurs and the transmission may fail. In this latter regime X3 too, the transmission efficiency is not optima, however, in this case as a result of friction losses (heat generation) due to the transmission slip.

In between the former two extreme regimes X1 and X3, i.e. after time t1 and before time t3, a transition section exists in graph B, wherein the transmission slip is well within acceptable levels and the optimum transmission efficiency is obtained. Therefore, it is the aim of the present control method to be able to control the transmission in such a transition regime X2. To be able to do this, it follows from the above that the transmission geometric ratio R2/R1 could be measured and compared to the transmission speed ratio RS to determine the transmission slip, but in practice this has already been found to be impractical. The present invention, instead, relies on the mutual dependency of and/or coherence between the transmission parameters, more specifically in the example between the transmission parameters of speed ratio RS and of output pulley pressure P2.

Graph C in FIG. 4 shows the 5 Hz component FPS2 of the measured output pulley pressure PS2 and graph D shows the 5 Hz component FRS of the measured speed ratio RS that are obtained in block II of FIG. 3. Graph E shows the multiplication signal MS that results from the multiplication of the two filtered signal FPS2 and FRS that are obtained in block III of FIG. 3. In graph E the above-mentioned three modes of operation of micro slip regime X1, transition regime X2 and macro slip regime X3, can indeed be recognised and the multiplication signal MS may thus be used to determine a instantaneously required control action $\Delta P2$.

In the present example of the control method according to the invention such control action $\Delta P2$ concerns the adjustment of the output pulley pressure P2, which is reduced if the transmission is in micro slip regime X1 regime, which may be recognised by the multiplication signal MS having an essentially constant effective or (progressive) average value and/or having an at least predominantly positive sign, any negative signal component being negligible.

Inter alia it is remarked that in the present example such sign is positive, but it may also be negative in case other transmission parameters are used in carrying out the method according to the invention, or when a parameter signal has been inverted e.g. for ease of computation and/or of control. Further, it is remarked that such (progressive) average value may be obtained by passing the multiplication signal MS through a low-pass filter having an upper threshold frequency that is lower than the said target frequency of—in this example—5 Hz of the band pass filter applied to the speed ratio signal RS and the output pressure signal PS2, e.g. only 3 Hz.

When the effective value of the said multiplication signal MS starts to reduce in relation to the reduction of the output pulley pressure P2, the transition regime X2 has been reached. At least initially the output pulley pressure P2 is reduced in this regime X2 too. Preferably such reduction is effected in proportion with the effective value of the multiplication signal MS in order to avoid a pressure undershoot as the said signal MS approaches zero. When the multiplication signal MS reaches zero or at least is negligibly small, the said control action ΔP2 is also made zero, which in graph E is true at time t2 falling within the transition regime X2.

If, however, the output pulley pressure P2 would be reduced even further, which is done in the present example solely for the purpose of illustration of the operating principle of the present control method and which for this purpose is considered to be equivalent with a torque increase during practical operation, firstly the multiplication signal MS becomes negative on average and thereafter, at time t3, the macro slip regime X3 is entered. In the macro slip regime X3 the multiplication signal MS shows comparatively large fluctuations of both positive and negative components. In the macro slip regime X3 the control action ΔP2 of increasing the output pulley pressure P2 is required. Preferably, such pressure increase is effected as fast as possible, e.g. as allowed by the hydraulic system of the transmission, in order to avoid the actual occurrence of macro slip as much as possible, as well as a damaging of the belt 3 and/or the pulleys 1, 2 as a result there from.

Figure 5:
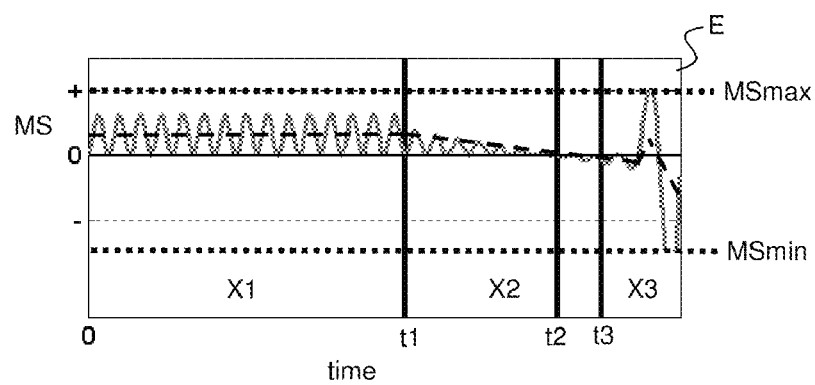

A favourable manner according to the invention for recognising the occurrence of macro slip, or at least for recognising that the control action ΔP2 should be to increase the output pulley pressure P2, is illustrated in FIG. 5. FIG. 5 largely corresponds to graph E of FIG. 4, however, including an indication of positive saturation or cut-off value MSmax and a negative cut-off value MSmin. This means that according to the invention any value of the said multiplication FRS*FPS2 of the filtered speed ratio signal FRS and the filtered output pressure signal FPS2 exceeding such cut-off values MSmax, MSmin are disregarded. The multiplication signal MS is set equal to the respectively exceeded cut-off value MSmax, MSmin that are set to a mutually different absolute value such that, at least in this example, the said negative cut-off value MSmin is larger, i.e. more negative than the said positive cut-off value MSmax. By doing so, in the macro slip regime X3 the effective value of the multiplication signal MS, which may for example be obtained by applying the said low pass filter and which is indicated by approximation by the predominantly horizontally running dashed line in FIG. 5, is provided with a persisting negative value, whereas the true multiplication FRS*FPS2 of the filtered speed ratio signal FRS and the filtered output pressure signal FPS2 fluctuates between positive and negative values. Of course such negative multiplication signal MS that is representative of the macro slip regime X3 can be easily distinguished from the positive multiplication signal MS that is representative of the micro slip regime X1. This allows the appropriate control action ΔP2 to be made univocal in relation to the sign of multiplication signal MS, i.e. will be the same in all three said regimes X1, X2 and X3: the second pulley pressure P2 is to be lowered if the multiplication signal MS is positive and vice versa. Possibly, the rate of change of the second pulley pressure P2 is set dependent on the absolute value of the multiplication signal MS.

Figure 6:
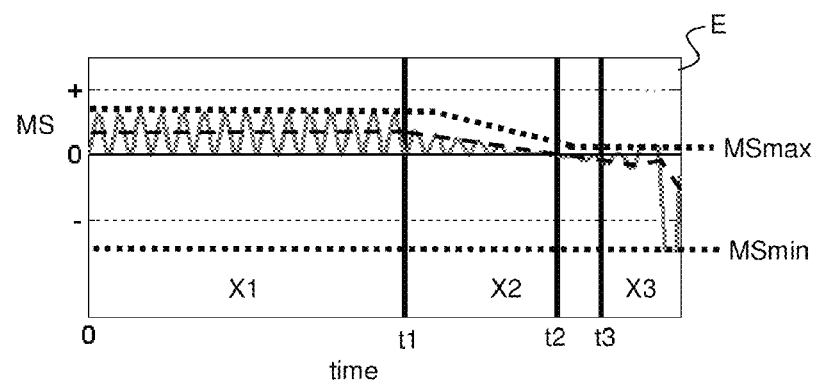

According to the invention, a particular sensitive and responsive control method is obtained in this respect when at least in this example the said positive cut-off value MSmax is made dependent on the effective value of the multiplication signal MS, preferably while applying a time delay between a lowering of the multiplication signal MS and the lowering of the positive cut-off value MSmax in response thereto. Such feature of the control method is illustrated in FIG. 6, which largely corresponds to graph E of FIG. 5, however wherein the positive cut-off value MSmax is made equal to twice the effective value of the multiplication signal MS. It can be seen in FIG. 6 that, by this feature of the invention, it can be prevented that the multiplication signal MS becomes positive in the macro slip regime X3, even if the initial fluctuation of the true multiplication FRS*FPS2 of the filtered speed ratio signal FRS and the filtered output pressure signal FPS2 yields a positive value.

Figure 7:
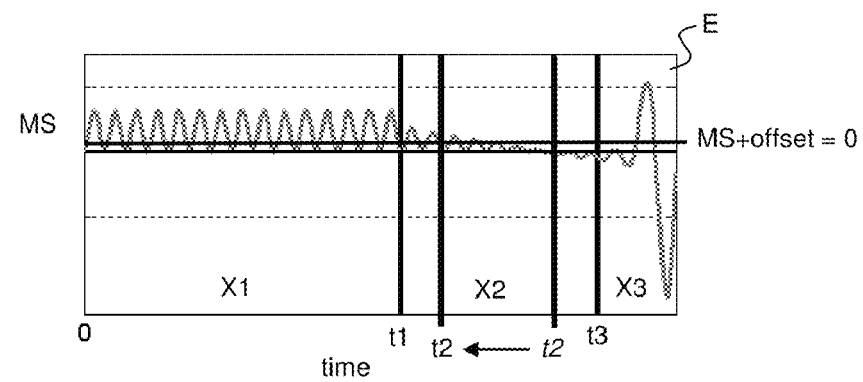

Further according to the invention, the transmission slip level that actually occurs in the transmission, which is controlled in accordance with the above-described method, may be influenced relatively easily by simply adding a positive offset value or a negative offset value to the multiplication signal MS, e.g. in block III of FIG. 3. Effectively this boils down to vertically displacing the x-axis of zero multiplication signal MS. As a result the corresponding zero control action ΔP2 is displaced relative to a different level of the second pulley pressure P2, as is illustrated in the graph E of FIG. 7 for a negative offset. By comparing FIG. 7 with FIG. 4 it is clear that by such offset the nominal second pulley pressure P2, i.e. the P2 pressure at zero multiplication signal MS (i.e. at time t2) is considerably higher than before, such that the actual transmission slip will be much lower, i.e. will be moved away from the macro-slip regime X3 towards to the micro-slip regime X1.

In practice the control method according to the invention may be preceded by a step of setting a fairly high output pulley pressure P2, e.g. from a pre-programmed look-up table in relation to the transmission speed ratio RS and the estimated torque to be transmitted, such that the transmission is surely operating in the micro slip regime X1 at commencement of such control method. Also, after the output pulley pressure P2 has been increased substantially in response to a possible entering of macro slip regime X3, it is advantageous to reinitialise the control method by departing from such a pre-programmed, high and save output pulley pressure P2.

Finally, it is remarked that for ease of computation and/or of control the transmission ratio signal RS can be linearised by applying the following equation:

$$RS=(1-SS1/SS2)/(1+SS1/SS2).$$

The invention claimed is:

1. Method for controlling a normal force exerted in a frictional contact of a friction type continuously variable transmission with a rotatable input shaft and a rotatable output shaft, which method includes the steps of:
generating a first parameter signal that is representative of at least changes in one of, or a ratio or difference between both of, a rotational speed of the input shaft and a rotational speed of the output shaft,
generating a second parameter signal that is representative of at least changes in the normal force in the frictional contact of the transmission,
generating a third parameter signal that is representative of and is preferably proportional to the multiplication of the said first and second parameter signals, and of:
controlling the normal force in the frictional contact in dependence on a characteristic of the third parameter signal.

2. Method according to claim 1, wherein the said characteristic of the third parameter signal is the sign (positive, negative or zero) thereof.

3. Method according to claim 1, wherein the said characteristic is the sign (positive, negative or zero) of the progressive average of the said third parameter signal.

4. Method according to claim 2, wherein either the said normal force is lowered if the said sign is positive and raised if the said sign is negative, or vice versa, with no change in the normal force being effected when the said third parameter signal is, or at least approximates, zero.

5. Method according to claim 2, wherein the control of the normal force is also realised in dependence on the magnitude of the said third parameter signal or of the progressive average thereof.

6. Method according to claim 5, wherein the raising or the lowering of the normal force is realised at a rate that is proportional to the said magnitude.

7. Method according to claim 1, wherein the magnitude of the normal force is actively oscillated about an average value thereof.

8. Method according to claim 7 wherein the amplitude of the normal force oscillation has a value in the range from 2.5% up to 25%, preferably from 5% up to 10% of the average value of the magnitude of the normal force.

9. Method according to claim 7 wherein the frequency of the normal force oscillation has a value in the range from 1 Hz up to 15 Hz, preferably from 2 Hz up to 8 Hz, more preferably from 3 Hz up to 5 Hz.

10. Method according to claim 1, wherein the first parameter signal represents the instantaneous magnitude of the said one of, or a ratio or difference between both of, the rotational speed of the input shaft and the rotational speed of the output shaft and wherein the second parameter signal represents the instantaneous magnitude of the said normal force in the frictional contact of the transmission.

11. Method according to the claim 10, wherein, before the said third parameter signal is generated, either one or both of the said first and second parameters signals is/are filtered, such that thereafter only changes of a first target frequency or range of target frequencies in a respective transmission parameter are represented by a respective filter parameter signal.

12. Method according to the claim 11, wherein the said target frequency or range of target frequencies falls in the range from 1 Hz up to 15 Hz, preferably from 2 Hz up to 8 Hz, more preferably from 3 Hz up to 5 Hz and most preferably coincides with or at least encompasses a frequency of a forced oscillation of the normal force.

13. Method according to claim 1, wherein the said third parameter signal is generated by multiplying the (filtered) first and second parameter signals and passing it through a low pass filter, preferably having an upper threshold frequency of 5 Hz or less, more preferably of less than 3 Hz.

14. Method according to claim 1, wherein the said third parameter signal is generated by first multiplying the (filtered) first and second parameter signals and then adding a positive offset value or a negative offset value thereto.

15. Method according to claim 1, wherein the said third parameter signal is generated by first multiplying the (filtered) first and second parameter signals and then limiting it to a positive cut-off value and a negative cut-off value, which cut-off values are mutually different.

16. Method according to claim 15, wherein at least one of the said cut-off values is made dependent on the progressive average value of the multiplication of the (filtered) first and second parameter signals, preferably amounts to twice such progressive average value, more preferably while applying a time delay there between for example by determining the respective cut-off value as twice the progressive average of the said multiplication result.

17. Method for controlling a normal force exerted in a frictional contact of a friction type continuously variable transmission with a rotatable input shaft and a rotatable output shaft, in particular according to claim 1, which method includes the steps of:
generating a first parameter signal that is representative of the magnitude of one of, or a ratio or difference between both of, a rotational speed of the input shaft and a rotational speed of the output shaft,
generating a second parameter signal that is representative of the magnitude of the normal force in the frictional contact of the transmission,
filtering out a first target frequency or range of target frequencies of both said first and second parameter signals,
generating a third parameter signal that is representative of and is preferably proportional to the multiplication of the said first and second parameter signals,
and of:
controlling the normal force in the frictional contact in dependence on a characteristic of the said third parameter signal.

18. Continuously variable transmission equipped with means of carrying out the method according to claim 1.

19. Method according to claim 3, wherein either the said normal force is lowered if the said sign is positive and raised if the said sign is negative, or vice versa, with no change in the normal force being effected when the said third parameter signal is, or at least approximates, zero.

20. Method according to claim 8 wherein the frequency of the normal force oscillation has a value in the range from 1 Hz up to 15 Hz, preferably from 2 Hz up to 8 Hz, more preferably from 3 Hz up to 5 Hz.

* * * * *